United States Patent Office 3,330,889
Patented July 11, 1967

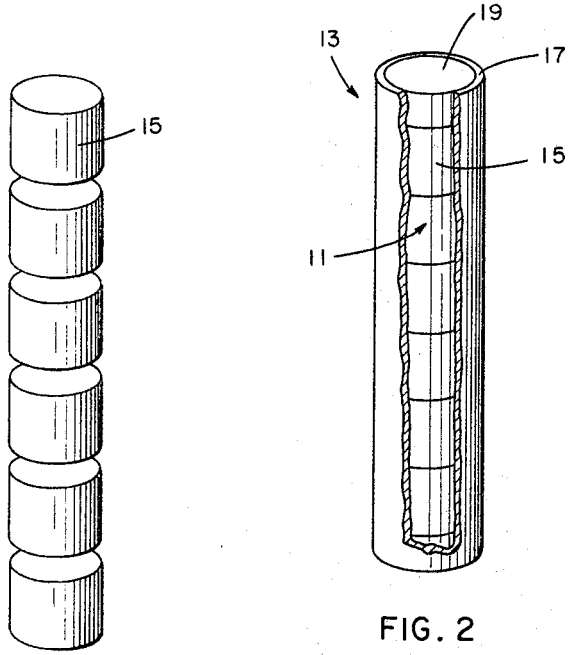

3,330,889
PREPARATION OF HEAT SOURCES FOR RADIOISOTOPE HEATED THERMOELECTRIC GENERATORS
George Samos, Timonium, and Justin L. Bloom, Rockville, Md., assignors, by mesne assignments, to the United States of America as represented by the United States Atomic Energy Commission
Filed June 12, 1964, Ser. No. 374,859
7 Claims. (Cl. 264—.5)

ABSTRACT OF THE DISCLOSURE

A process for making strontium-90 titanate heat sources, comprising adjusting the pH and temperature of an aqueous solution of strontium-90 ions, adding an organic titanate ester, and separating the resulting precipitate of strontium-90 titanate.

---

This invention relates to the preparation and synthesis of radioactive heat sources and more particularly to the preparation of radioactive heat sources for radioisotopes heated thermoelectric generators.

In radioisotope heated thermoelectric generators, it has been desired to provide strontium-90 containing titanates as heat sources or fuel. The radio-active ingredient strontium-90 is a readily available long half-lived isotope whose radiation energies renders it suitable for systems for nuclear auxiliary power and for satellites, and the titanate has a relatively high melting point and a low solubility in sea water. The strontium titanate fuel available heretofore, however, has had low strontium density, purity or stability or has been complicated, difficult, or time consuming to fabricate. Additionally, it has been advantageous to provide an economical process for directly synthesizing and preparing the strontium titanate fuel at low temperatures and pressures since the necessary high radiation levels require remote synthesis and fabrication.

An object of this invention, therefore, to provide an improved method producing high density, radioactive strontium 90 fuel for radioisotope heated thermoelectric generators;

It is another object of this invention to provide high density radioactive, strontium 90 fuel for radioisotope heated thermoelectric generators.

It is also an object of this invention directly to form strontium-titanate particles at low temperatures;

It is also an object of this invention directly to form strontium-titanate fuel at low pressure;

It is a further object of this invention to provide a fast, clean, method with minimum handling for producing strontium 90 fuel;

It is still a further object of this invention to form strontium titanate from a strontium slurry and an organic titanate.

In accordance with this invention, there is provided an economical, low temperature, low pressure method for the direct precipitation and production of high density radioactive strontium 90 fuel for a heat source for thermoelectric generators such as the generator disclosed in the U.S. Application S.N. 338,539 filed Jan. 17, 1964, now Patent No. 3,296,032, and assigned to the assignee of this invention. The method and materials involved in this invention utilize standard and well known techniques and apparatus and are highly flexible for a wide range of applications, energies and generator operating lifetimes. More specifically, this invention involves the steps, comprising directly precipitating strontium from a basic strontium solution, stirring the resulting slurry, heating the stirred slurry while slowly adding an organic titanate, removing titanate of strontium, tamping the removed material into a crucible, heating the latter to produce green pellets, and cladding them in a fuel cylinder. With the proper selection of conditions and apparatus as described in more detail hereinafter, the required high density fuel is produced easily, rapidly, relatively inexpensively and directly with minimum handling at high temperatures and pressures.

Various other objects and advantages will appear from the following description of two embodiments of this invention, and the novel features will be particularly pointed out hereinafter in connection with the appended claims.

In the figures where like parts are marked alike:
FIG. 1 is a partial three-dimensional view of the fuel of this invention;
FIG. 2 is a partial cut-away view of a fuel heat element assembly comprising the fuel of FIG. 1 in an outer cladding.

The strontium-90 fuel and method of this invention are useful in providing a sintered ceramic fuel element for a radioisotope heated thermoelectric generator for space and sea applications requiring an electrical output from the thermocouples of up to 100 watts or more for up to 10 years. These elements have large or kilocurie amounts of radioactive strontium-90 therein and are remotely fabricated in hot cells where it is difficult, expensive, hazardous and time consuming to provide high temperatures and pressures. Also, the fuel density is high for maximum generator efficiency, the fuel is uniformly pure for providing a high thermal conductivity, and the fuel is free of binders for providing stability in the high temperature, high radiation environment produced by the strontium-90. Additionally, the fuel has high strontium tie up for safe use, handling, and operation.

Referring to FIGS. 1–2, fuel element 11 contains radioactive strontium-90, hereinafter referred to as the strontium. This fuel element has an outer radiation resistant cladding 13, made, for example, from 316 stainless steel. The element 11 or core is completely encased in this cladding in intimate contact therewith and to this end several right cylindrical high temperature fuel discs 15 are inserted in a metal tube 17 to which one or more metal end plugs 19, compatible with or the same as tube 17, are welded in an inert atmosphere to form a right cylindrical cladding 13.

The strontium-90 is obtained from high energy atomic bombardment. For example, it is produced as a waste product during the controlled fission reaction involving uranium and plutonium in nuclear reactors. The strontium-90 is absorbed from the fuel on suitable inorganic ion exchange material such as precipitated gel type sodium alumino silicate cation exchanger. Subsequently this ion exchange matrix is leached with small quantities of dilute hydrochloric acid to produce a feed solution of strontium chloride containing the strontium-90. This feed solution is stored in appropriate facilities at the reactor site.

The strontium chloride is converted into strontium carbonate in another ion exchanger conversion column where the resin, such as Dowex 1 brand resin, is converted to the carbonate form by pre-treatment with concentrated $(NH_4)_2CO_3$. The column is washed free of ammonia with repeated column-volumes of water and the effluent solution of strontium carbonate is concentrated by evaporation. Advantageously, the desired strontium carbonate is alternately obtained, however, from the AEC facility at Hanford.

In experiments described hereinafter, feed solutions were prepared by dissolving 6 g. of the strontium carbonate in the minimum quantity of 3 N nitric acid. The excess acid in these solutions was neutralized to the bromothymol blue end point (pH 7.3) with caustic (sodium hydroxide) and diluted with 100 ml. of water to produce a concentration of the strontium of about 28 g./l. For production runs, three liters of about 0.1 NHNO₃ feed containing 35 g./l. of the strontium, which is a 10,000 curie batch, is fed to the reaction vessel. The latter may be a 33 liter resin kettle sized to process strontium feed solution of 10,000 to 20,000 curies of Sr–90.

It has been discovered in accordance with this invention that the addition of excess sodium hydroxide to the strontium nitrate solution results in the precipitation of strontium hydroxide. To this end sufficient 50% NaOH is added to neutralize the acid feed solution of strontium and then to provide twice the stoichiometric quantity of NaOH required to react with all the cations. The addition of ethanolamine titanate above 80° C. to the resultant slurry results in the formation of strontium titanate. This product has been confirmed, for example, by X-ray diffraction and has a high melting point.

One suitable ethanolamine titanate is the Du Pont, Tyzor TE brand ethanolamine titanate which can be diluted with water without undergoing hydrolysis for several hours, thus providing a simple, rapid and safe means for remote operation with small fire hazard. Moreover, the ethanolamine produced by this hydrolysis reaction is soluble in water, and has a high boiling point of 172° C., which is far above the 95° C. maximum temperature at which the synthesis of this invention is carried out.

In a series of experiments where the effects on the precipitate of varying major process parameters were evaluated to obtain high densities, the parameters established were: precipitation temperature 90° C., hydroxide concentration twice the stoichiometric amount needed for conversion, water diluted ethanolamine titanate containing 5% excess of the stoichiometric quantity of strontium, rate of addition of ethanolamine titanate about 60 minutes, digestion time about two hours, digestion temperature 90° C.

It has been found that excess (NaOH) caustic concentration provides high efficiency. For example, it was found that when only 3.3 g. of NaOH was added to the neutralized nitrate solution and the Tyzor TE reagent was added the precipitate was of gelatinous appearance and settled extremely slowly. Also, one-quarter of the strontium originally present in the feed remained in the filtrate.

The effect of this NaOH concentration is illustrated by the results of actual experiments whose results are listed in the following table:

use of potassium hydroxide instead of sodium hydroxide is detrimental to the properties of the precipitate.

Further tests show that the precipitation and digestion temperature of 90° C. is required for complete precipitation of the strontium since precipitate formed at lower temperatures (e.g. 45° C.) were gelatinous, fluffy and slow settling.

It has additionally been found experimentally and in plant scale studies that the described excess NaOH direct precipitation method of this invention, produces a pure, rapidly precipitating strontium titanate and that this rate of precipitation is rapid even in the presence up to 1 wt. percent calcium or 0.5 wt. percent iron. Also, no significant strontium losses were observed in the presence of these additives in these plant studies where three liters of about 0.1 N HNO₃ feed containing 35 g./l. strontium were fed to the reaction vessel. In these studies three feed solutions were used: batch 1 contained no additive, batch 2 contained an additional 1 wt. percent calcium and batch 3 contained an additional 0.5 wt. percent iron.

The feed was heated to 90° C. with stirring. Sufficient 50% NaOH was added to neutralize the acid and to provide twice the stoichiometric quantity of the NaOH required to react with all the cations. The solution was maintained at 90° C. and was continually stirred during which a stoichiometric quantity of titanium was added to the reactor as a 10 wt. percent solution of Tyzor TE in water was added. This was a water solution to provide a high flash point. The Tyzor TE ethanolamine titanate addition was made over a 1 hour period; the slurry was digested at 90° C. for an additional two hours with constant agitation and reflux of the vapors.

This immunity from the effects of calcium, however, appears to be limited. For example, for concentrations of calcium from 1 to 4 percent of the strontium the initial settling rate was ⅕ that of the pure strontium titanate precipitate. The settling rates for 5 and 6 percent calcium were 30 percent less than that for the pure strontium. Also, settling volumes for the 1 to 4 percent calcium were about 60 percent greater than for the pure strontium precipitates.

The strontium titanate, prepared as described above is fabricated into discs 15 shown in FIG. 1 by a slip casting technique. To this end good, rapidly settling strontium titanate, prepared by the above described use of excess NaOH is washed by decantation. A fritted disc, to which vacuum is applied, is used to remove the supernatant liquid. A portion of the precipitate is drawn to the frit.

TABLE I.—THE EFFECT OF VARIATION IN PROCESS PARAMETERS ON DIRECT PRECIPITATION OF STRONTIUM TITANATE

[Feed: 125 ml. of 28 g./l.Sr]

| Expt. No. | NaOH¹ Added, g. | Precipitating Temp., °C. | TE Reagent | | Digestion | | Sr in Supernate, g. | Settling Rate, cm./hr. | Filtration² Rate, ml./min. |
|---|---|---|---|---|---|---|---|---|---|
| | | | Concentration, percent g./l. | Time of Add'n, min. | Temp., °C. | Time, min. | | | |
| TE10 | 3.3 | 90 | 100 | Instant | 90 | 30 | Large | None in 3 hours. | 2.5 |
| TE11 | 6.6 | 90 | 100 | Instant | 90 | 30 | Very slight | 9 | 4 |
| TE12 | 3.3 | 90 | 100 | 10 | 90 | 30 | Slight | 0.4 | 3 |

¹ The sodium hydroxide is added in 50 weight percent solution.
² Twenty-five ml. of slurry transferred to 4.6 cm. Buchner funnel and filtered under 26-inch vacuum through Whatman #2 filter paper.

X-ray diffraction also illustrates this effect in that the slowly settling samples exhibited the lack of strontium titanate peaks and the presence of strontium carbonate peaks.

It has also been found that potassium hydroxide cannot replace the sodium hydroxide. For example, although the pH is at least as high as with the NaOH (even over 13 pH), some strontium is always found in the filtrate. Moreover, the precipitates settle slowly and appear somewhat gelatinous and bulky. It is thus apparent that the After removal of the water, the precipitates separates from the frit in the form of a disc. Fring at 1470° C. finishes the disc by sintering.

Alternately, the precipitate is filtered through a Soxhlet filter paper thimble, allowing the water to drain off by gravity. After drying the precipitate separates from the sides of the thimble in the shape of a cylinder. This is tamped into a zirconium oxide mold and sintered. The disc and cylinder shrink about fifty percent, but remain free of cracks and are very hard. Their densities are up

United States Patent Office 3,330,889
Patented July 11, 1967

3,330,889
PREPARATION OF HEAT SOURCES FOR RADIOISOTOPE HEATED THERMOELECTRIC GENERATORS
George Samos, Timonium, and Justin L. Bloom, Rockville, Md., assignors, by mesne assignments, to the United States of America as represented by the United States Atomic Energy Commission
Filed June 12, 1964, Ser. No. 374,859
7 Claims. (Cl. 264—.5)

ABSTRACT OF THE DISCLOSURE

A process for making strontium-90 titanate heat sources, comprising adjusting the pH and temperature of an aqueous solution of strontium-90 ions, adding an organic titanate ester, and separating the resulting precipitate of strontium-90 titanate.

---

This invention relates to the preparation and synthesis of radioactive heat sources and more particularly to the preparation of radioactive heat sources for radioisotopes heated thermoelectric generators.

In radioisotope heated thermoelectric generators, it has been desired to provide strontium-90 containing titanates as heat sources or fuel. The radio-active ingredient strontium-90 is a readily available long half-lived isotope whose radiation energies renders it suitable for systems for nuclear auxiliary power and for satellites, and the titanate has a relatively high melting point and a low solubility in sea water. The strontium titanate fuel available heretofore, however, has had low strontium density, purity or stability or has been complicated, difficult, or time consuming to fabricate. Additionally, it has been advantageous to provide an economical process for directly synthesizing and preparing the strontium titanate fuel at low temperatures and pressures since the necessary high radiation levels require remote synthesis and fabrication.

An object of this invention, therefore, to provide an improved method producing high density, radioactive strontium 90 fuel for radioisotope heated thermoelectric generators;

It is another object of this invention to provide high density radioactive, strontium 90 fuel for radioisotope heated thermoelectric generators.

It is also an object of this invention directly to form strontium-titanate particles at low temperatures;

It is also an object of this invention directly to form strontium-titanate fuel at low pressure;

It is a further object of this invention to provide a fast, clean, method with minimum handling for producing strontium 90 fuel;

It is still a further object of this invention to form strontium titanate from a strontium slurry and an organic titanate.

In accordance with this invention, there is provided an economical, low temperature, low pressure method for the direct precipitation and production of high density radioactive strontium 90 fuel for a heat source for thermoelectric generators such as the generator disclosed in the U.S. Application S.N. 338,539 filed Jan. 17, 1964, now Patent No. 3,296,032, and assigned to the assignee of this invention. The method and materials involved in this invention utilize standard and well known techniques and apparatus and are highly flexible for a wide range of applications, energies and generator operating lifetimes. More specifically, this invention involves the steps, comprising directly precipitating strontium from a basic strontium solution, stirring the resulting slurry, heating the stirred slurry while slowly adding an organic titanate, removing titanate of strontium, tamping the removed material into a crucible, heating the latter to produce green pellets, and cladding them in a fuel cylinder. With the proper selection of conditions and apparatus as described in more detail hereinafter, the required high density fuel is produced easily, rapidly, relatively inexpensively and directly with minimum handling at high temperatures and pressures.

Various other objects and advantages will appear from the following description of two embodiments of this invention, and the novel features will be particularly pointed out hereinafter in connection with the appended claims.

In the figures where like parts are marked alike:
FIG. 1 is a partial three-dimensional view of the fuel of this invention;
FIG. 2 is a partial cut-away view of a fuel heat element assembly comprising the fuel of FIG. 1 in an outer cladding.

The strontium-90 fuel and method of this invention are useful in providing a sintered ceramic fuel element for a radioisotope heated thermoelectric generator for space and sea applications requiring an electrical output from the thermocouples of up to 100 watts or more for up to 10 years. These elements have large or kilocurie amounts of radioactive strontium-90 therein and are remotely fabricated in hot cells where it is difficult, expensive, hazardous and time consuming to provide high temperatures and pressures. Also, the fuel density is high for maximum generator efficiency, the fuel is uniformly pure for providing a high thermal conductivity, and the fuel is free of binders for providing stability in the high temperature, high radiation environment produced by the strontium-90. Additionally, the fuel has high strontium tie up for safe use, handling, and operation.

Referring to FIGS. 1–2, fuel element 11 contains radioactive strontium-90, hereinafter referred to as the strontium. This fuel element has an outer radiation resistant cladding 13, made, for example, from 316 stainless steel. The element 11 or core is completely encased in this cladding in intimate contact therewith and to this end several right cylindrical high temperature fuel discs 15 are inserted in a metal tube 17 to which one or more metal end plugs 19, compatible with or the same as tube 17, are welded in an inert atmosphere to form a right cylindrical cladding 13.

The strontium-90 is obtained from high energy atomic bombardment. For example, it is produced as a waste product during the controlled fission reaction involving uranium and plutonium in nuclear reactors. The strontium-90 is absorbed from the fuel on suitable inorganic ion exchange material such as precipitated gel type sodium alumino silicate cation exchanger. Subsequently this ion exchange matrix is leached with small quantities of dilute hydrochloric acid to produce a feed solution of strontium chloride containing the strontium-90. This feed solution is stored in appropriate facilities at the reactor site.

The strontium chloride is converted into strontium carbonate in another ion exchanger conversion column where the resin, such as Dowex 1 brand resin, is converted to the carbonate form by pre-treatment with concentrated $(NH_4)_2CO_3$. The column is washed free of ammonia with repeated column-volumes of water and the effluent solution of strontium carbonate is concentrated by evaporation. Advantageously, the desired strontium carbonate is alternately obtained, however, from the AEC facility at Hanford.

In experiments described hereinafter, feed solutions were prepared by dissolving 6 g. of the strontium carbonate in the minimum quantity of 3 N nitric acid. The excess acid in these solutions was neutralized to the bromothymol blue end point (pH 7.3) with caustic (sodium hy-